Dec. 9, 1930.  H. K. FAIRALL  1,784,515
BINOCULAR NONSTOP MOTION PICTURE CAMERA
Filed Nov. 21, 1925    5 Sheets-Sheet 1

Fig.1

INVENTOR
HARRY K. FAIRALL
By
ATTORNEY

Dec. 9, 1930.    H. K. FAIRALL    1,784,515
BINOCULAR NONSTOP MOTION PICTURE CAMERA
Filed Nov. 21, 1925    5 Sheets-Sheet 2

INVENTOR
HARRY K. FAIRALL
BY
ATTORNEY

Dec. 9, 1930.     H. K. FAIRALL     1,784,515
BINOCULAR NONSTOP MOTION PICTURE CAMERA
Filed Nov. 21, 1925     5 Sheets-Sheet 3

INVENTOR
HARRY K. FAIRALL
BY
ATTORNEY

Dec. 9, 1930.   H. K. FAIRALL   1,784,515
BINOCULAR NONSTOP MOTION PICTURE CAMERA
Filed Nov. 21, 1925   5 Sheets-Sheet 4

INVENTORS
HARRY K. FAIRALL
BY
ATTORNEY

Dec. 9, 1930.   H. K. FAIRALL   1,784,515
BINOCULAR NONSTOP MOTION PICTURE CAMERA
Filed Nov. 21, 1925   5 Sheets-Sheet 5

INVENTOR
HARRY K. FAIRALL
BY
ATTORNEY

Patented Dec. 9, 1930

1,784,515

UNITED STATES PATENT OFFICE

HARRY K. FAIRALL, OF LOS ANGELES, CALIFORNIA, ASSIGNOR TO MULTICOLOR LTD., OF LOS ANGELES, CALIFORNIA, A CORPORATION OF CALIFORNIA

BINOCULAR NONSTOP-MOTION-PICTURE CAMERA

Application filed November 21, 1925. Serial No. 70,489.

My invention relates to the art of photography, and it particularly relates to motion picture cameras.

One important object of my invention is to provide a superior advancing mechanism which is primarily for use in cameras, but with minor alterations may be advantageously used in projectors.

In ordinary cameras and projectors the advancing mechanism operates intermittently in order to intermittently advance the film. Such advancing mechanism contains a considerable number of parts which are subjected to material strains due to starting and stopping, and is noisy, which is undesirable.

It is an object of this invention to provide an advancing mechanism which is continuous in motion and also an advancing mechanism which has a harmonious motion. By virtue of the continuous and harmonious motions I provide an advancing mechanism which is better than intermittent advancing mechanisms, because there is not the strain or vibration resulting from starting and stopping and there is practically no noise.

It is another object of my invention to provide an advancing mechanism which is counterbalanced. This feature contributes to the smooth operation of the mechanism.

It is a further object of this invention to provide an advancing mechanism which is very satisfactory for high speed operation such as is necessary in slow motion work.

It is a still further object of this invention to provide a resilient guide and holding device for keeping the film in proper position so that it may be properly engaged by the advancing mechanism.

In stereoscopic motion picture work it is necessary to photograph two images simultaneously on adjacent strips of film. These two films must be advanced simultaneously in the camera when taken.

It is also an object of my invention to provide an advancing mechanism which is so designed that it may comprise two co-acting advancers and therefore be used to advantage in stereoscopic apparatus.

It is imperative in stereoscopic work that the frames of adjacent strips of film be paired so they are projected together just as they are exposed. If two frames not exposed at the same instant are shown on a screen, the image will be inaccurate. Since the action in adjacent frames is so similar it is difficult to pair these frames by eye.

It is another object of this invention to provide a means for exposing the edge portions of corresponding frames of two films in order to mark them so that they may be easily and correctly paired.

In some cameras rewind reels are driven by pulleys (through belts) which are carried on doors of the mechanism compartments of the cameras. The drive pulleys are on shafts which drivably engage shafts carried inside the mechanism compartment. When the doors are being closed, care must be exercised to rotate the shaft into aligning relationship so that they will mesh properly with each other.

It is still another object of this invention to provide a pulley shaft on which a pulley is carried, which shaft is resiliently held in a certain axial position. When this pulley shaft is moved into operating position the shaft will be moved axially if it is not in proper meshing position with another shaft, and will be moved into proper engagement with the other shaft when either of the shafts is rotated and proper radial alignment is acquired.

Other objects and advantages of this invention will be made manifest hereinafter.

Referring to the drawings in which I illustrate a preferred embodiment of my invention.

A camera 20 embodying the feature of my invention is supported on a tripod 21 (Fig. 1) according to standard practice. Referring particularly to Fig. 2 the camera 20 has a shell 22 which is provided with a mechanism chamber 23 which occupies the space in the shell 22 behind a vertically extending wall 24. The camera shown in the drawings is designed for stereoscopic work and includes mechanisms for simultaneously operating two strips of film.

Extending centrally through the mechanism chamber 23 is a main shaft 26 which is rotatably supported by bearings in the shell 22. An end of the main shaft 26 extends through the rear wall of the shell 22 and has a crank 27 secured thereto by means of which the camera is operated. A large drive gear 28 is rigidly secured on the main shaft 26 adjacent to the rear wall of the shell 22. This gear 28 meshes with a smaller gear 29 which is rigidly secured on a shutter shaft 30. This shutter shaft 30 is rotated by means of the gears 28 and 29, and it extends through the mechanism chamber 23 above the main shaft 26, being rotatably supported in suitable bearings. The gear 28 also meshes with a smaller gear 32 which is rigidly secured on an advancing mechanism drive shaft 33 which is rotatably supported in the mechanism chamber 23 directly below the main shaft 26.

Extending across the mechanism chamber 23 above the shutter shaft 30 and substantially at right angles thereto is a feed sprocket shaft 35 which is rotatably supported at each end thereof by bearings 36, these bearings 36 being supported in brackets 37. The shutter shaft 30 is provided with a gear 39 which engages a gear 40 secured to the feed sprocket shaft 35 for rotatably driving the shaft 35. Adjacent to the opposite ends of the feed sprocket shaft 35 there are secured feed sprockets 42 around which films 43 extend. It will be seen that there are two feed sprockets 42, each having a film passing therearound and in engagement therewith. Each of the feed sprockets 42 is provided with rollers 44 and 45 which are suitably supported to hold each of the films 43 in contact with one of the feed sprockets 42.

Extending across the mechanism chamber 23 substantially at right angles to the advancing mechanism drive shaft 33 is a take-up sprocket shaft 47 which is situated above the advancing mechanism drive shaft 33 but below the main shaft 26. This take-up sprocket shaft is rotatably supported at each end thereof by bearings 48, each of which is supported by a bracket 49. The main shaft 26 is provided with a gear 50 and the take-up sprocket shaft 47 is provided with a gear 51 which is engaged and driven by the gear 50. Near each end of the take-up sprocket shaft 47 there is a take-up sprocket 53 and over each of these sprockets 53 the film 43 is extended. Each of the sprockets 53 is provided with rollers 55 and 56 which are mounted so that they will hold one of the films 43 in contact with each of the take-up sprockets 53.

Figure 1:
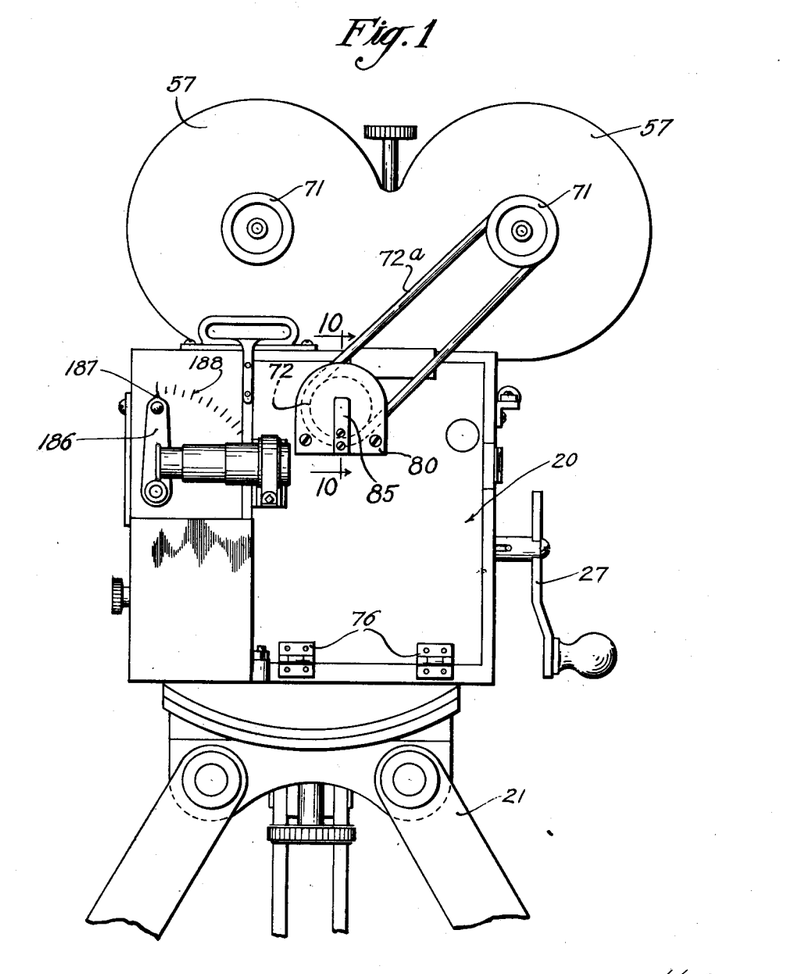
Fig. 1 is an elevational view of a camera having the features of my invention.
Figures 2, 10, 11:
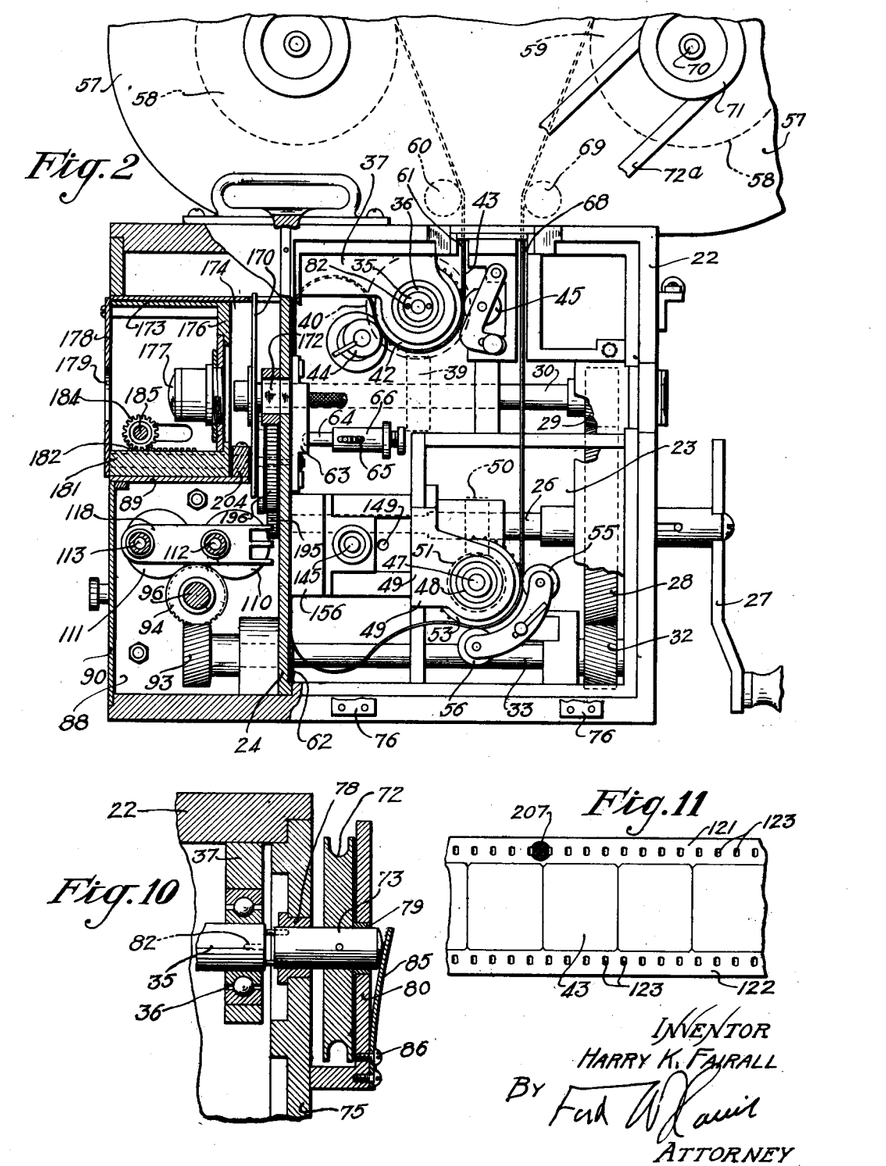
Fig. 2 is an elevational view of the camera partly in section showing certain features of my invention and being taken substantially on the line 2—2 of Fig. 3.
Fig. 10 is a section taken on the line 10—10 of Fig. 1.
Fig. 11 is a fragmentary view of a strip of film showing the manner in which it is marked by the apparatus of my invention.

The films 43 as shown in Figs. 1 and 2 are carried in film magazines 57 which are carried on the upper wall of the shell 22. The magazines 57 each carry a feed reel 58 and a rewind reel 59. Each film 43 extends from the feed reel 58 as shown best in Figs. 1 and 2, over a roller 60 and through an opening 61 in the upper wall of the shell 22 and then passes around a feed sprocket 42. Each film 43 passes from its feed sprocket 42 to a vertical channel 62 formed in the rear face of the wall 24. As shown in Fig. 2 each film is adapted to lie flat in each of the channels 62. Each film is held in each channel 62 by a clamp plate 63. Each clamp plate 63 is resiliently held against the film by a plunger 64 which is operated by a spring 65. Each plunger and spring 64 and 65 is supported by a housing 66. Each of the films 43 extends from the lower end of each of the channels 62 to one of the take-up sprockets 53. From each of the take-up sprockets 53 each film passes vertically through an opening 68 formed in the upper part of the shell 22 and each film passes over a roller 69 to one of the rewind reels 59.

Each rewind reel 59 is rotatably supported on a shaft 70 which has a pulley 71 secured to the outer end thereof. As shown in Fig. 1 a belt 72a passes over each of the pulleys 71 and over a rewind drive pulley 72. Referring to Fig. 10 each rewind drive pulley 72 is rigidly secured on a drive pulley shaft 73. Each shaft 73 is rotatably supported by a door 75, each door being hinged at 76 to the shell 22. There is a door 75 on each side of the mechanism chamber 23 so that access to the mechanism therein may be obtained. Each shaft 73 is carried in bearings 78 and 79, each bearing 79 being carried in a wall 80 which extends parallel to each door 75 and is supported thereby. Each rewind drive pulley 72 is carried between one of the doors 75 and one of the walls 80. The drive pulley shafts 73 are adapted to be driven by the feed sprocket shaft 35. Each end of the feed sprocket shaft 35 is provided with recesses 82 into which pins 83 extend from the inner ends of each of the drive pulley shafts 73. Each shaft 73 is adapted to have a certain amount of axial movement but is resiliently retained in innermost axial position by a leaf spring 85 which is secured by screws 86 to each of the walls 80. When each door 75 is in closed position the drive shafts 73 are brought into adjacency with the feed sprocket shaft 35. If the recesses 82 and the pins 83 are in registry, the pins will enter into the recesses 82 and the drive shafts 73 will thus be in drivable engagement with the feed sprocket 35. If the recess and pins are out of engagement the shafts 73 will be forced axially into their outer position, as shown in Fig. 10. However, when the feed sprocket shaft 35 is rotated, the recesses 82 will be brought into registry with the pins 83 whereat the pins 83 enter the recesses. This feature of the invention is of considerable convenience since it eliminates any care in properly radially aligning the shafts 35 and 73 so that the recesses 82 and the pins 83 will be in registry.

Figure 3:
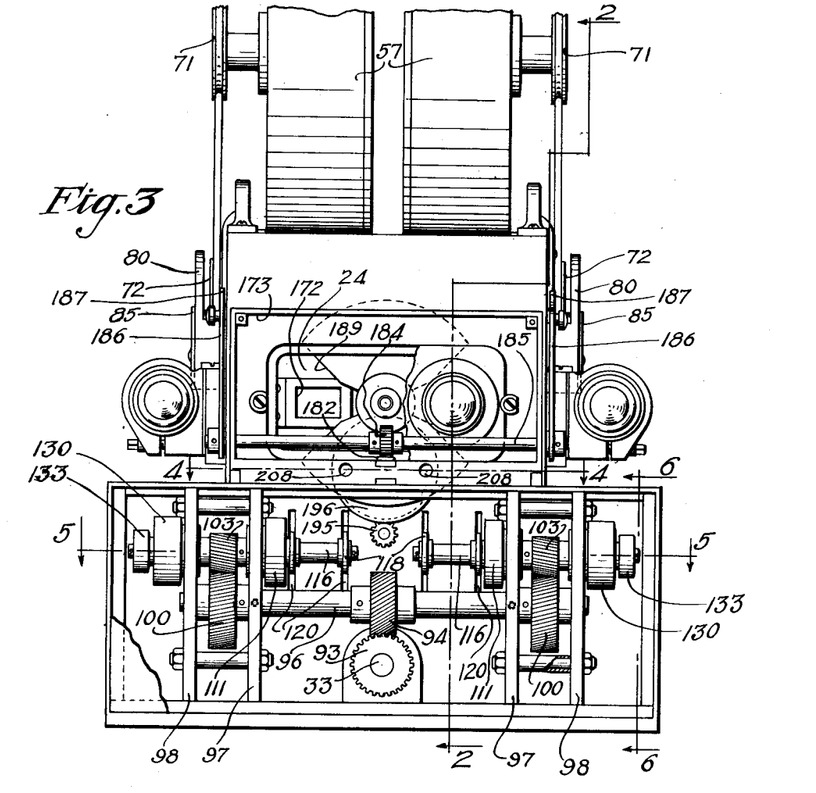
Fig. 3 is an elevational view taken from the front of the camera, the front plates being removed to clearly show the advancing mechanism.
Figure 5:
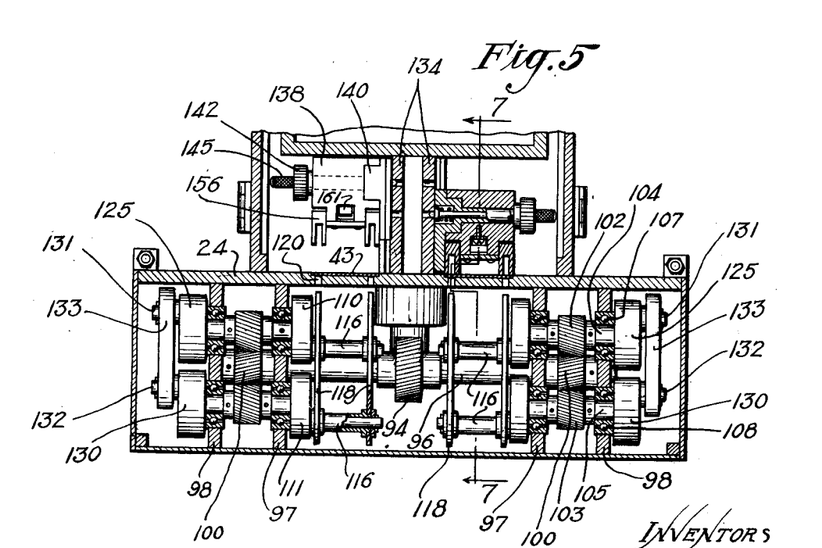
Fig. 5 is a section taken on the line 5—5 of Fig. 3.
Figure 6:
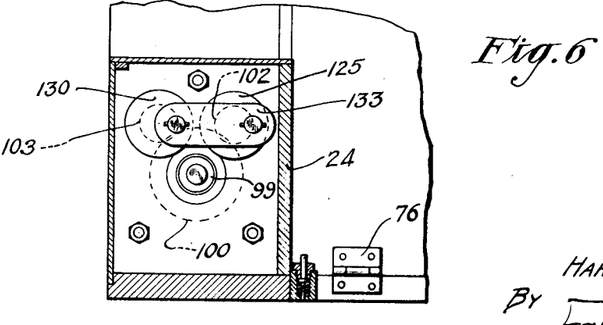
Fig. 6 is a section taken on the line 6—6 of Fig. 3.
Figure 7:
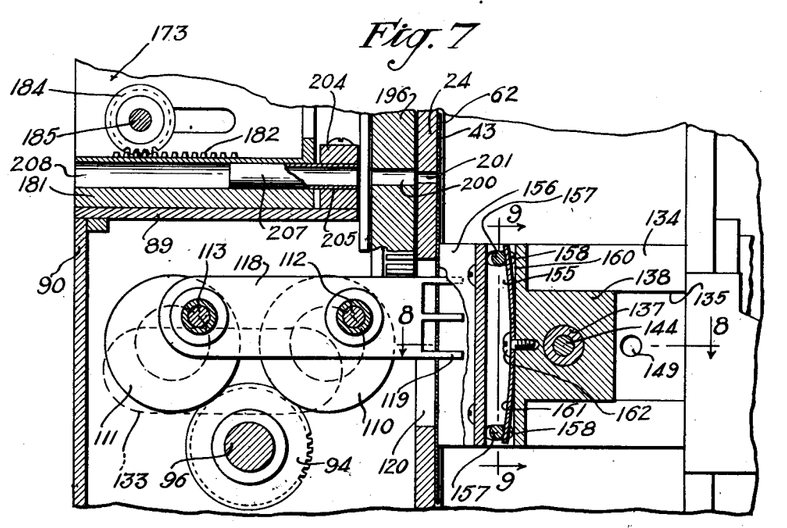
Fig. 7 is a section taken on the line 7—7 of Fig. 5.

The advancing mechanism drive shaft 33 extends forwardly from the mechanism chamber 23 so that the forward end thereof rests in an advancing mechanism compartment 88. The lower part of the compartment 88 is defined by the lower wall of the shell 22. The rear part is defined by the vertical wall 24 and the upper part is defined by a horizontal wall 89. The front of the compartment 88 is closed by a removable cover 90, this cover being ordinarily in place during the operation of the camera which may be readily removed for inspecting the advancing mechanism of the invention. The forward end of the advancing mechanism drive shaft is provided with a gear 93 which drives a gear 94 which is in mesh therewith. This gear 94 (Figs. 2, 3 and 5) is rigidly secured at the central part of a cross shaft 96. The cross shaft 96 extends through pairs of side walls 97 and 98, being rotatably supported by these walls 97 and 98 by bearings 99. At each end of the cross shaft 96 and between walls 97 and 98 is a gear 100, each gear being rigidly secured on the cross shaft 96. Each gear 100 meshes with a primary gear 102 and a secondary gear 103. Each of the primary gears 102 is secured on a primary shaft 104 and each secondary gear 103 is secured on a secondary shaft 105. Each primary shaft 104 is rotatably supported in bearings 107, which bearings are carried by the pairs of walls 97 and 98, and each secondary shaft 105 is rotatably supported by bearings 108 carried in the pairs of walls 97 and 98. The inner end of each of the primary shafts 104 is provided with a concentric head 110 (Fig. 7) and the inner end of each secondary shaft 105 is provided with a concentric head 111. Extending inwardly from each head 110 is a primary crank 112 and extending inwardly from each head 111 is a secondary crank 113. The cranks 112 and 113 are adapted to occupy the same circumferential positions at the same time and travel through a circle which has the same diameter. Each of the cranks 112 and 113 is provided with a sleeve 116 which is rotatably carried thereon. Each pair of primary and secondary cranks is adapted to carry a pair of advancing members 118. As shown best in Fig. 7 the pairs of advancing members 118 are carried on the sleeves 116. The advancing members are in the form of flat plates and rest in parallel horizontal positions at all times. This is because the axes of the primary and secondary cranks 112 and 113 at all times rest in a common horizontal plane. Also, the advancing members are continuous in motion and each point thereof defines a circle and each point at an instant is traveling at the same speed as another point of the advancing members. The forward ends of each of the advancing members 118 is provided with film engaging fingers 119. The forward ends of each of the advancing members 118 are adapted to extend through a vertical slot 120 formed in the wall 24. Referring to Fig. 5, each channel 62 is provided with a pair of slots 120. The pairs of slots 120 are situated at opposite sides of the channels 62 and are positioned adjacent to the edge portions of the film 43. As shown in Fig. 11, each of the films 43 have edge portions 121 and 122 in which perforations 123 are formed.

During the operation of the camera the fingers 119 of the advancing members 118 are extended through the slots 120 and through certain of the perforations in the film 43. As the advancing members move downwardly, the film is advanced downwardly therewith, thus moving the film a proper distance.

When the crank 27 is operated, the main shaft 26 is caused to drive the advancing mechanism drive shaft 33 by means of the gears 28 and 32. The gear 93 at the forward end of the advancing mechanism drive shaft 33 drives the gear 94 of the cross shaft 96. The gears 100 at each end of the cross shaft 96 drive the primary and secondary gears 102 and 103, thus rotating the primary and secondary shafts 104 and 105. Therefore, the primary and secondary cranks 112 and 113 are caused to move through circular paths. Also, the advancing members 118 which are carried by the primary and secondary cranks 112 and 113 translate along circular paths. It is obvious, therefore, that the advancing members 118 move continuously and harmoniously at a given rate of speed. During one-half of a revolution of the advancing members 118 the fingers 119 engage the film 43 and advance it in a downward direction. During the other half of a revolution the fingers 119 are out of engagement with the film 43 and are returned to upper position where the films are again engaged thereby. During the engagement period of the film by the fingers there is a relative sliding movement therebetween, but the friction resulting therefrom is very small and causes no detrimental effect on the film.

The fingers 119 do not tear the film because they enter the perforations 123 during a period of the circular travel of the fingers when they are moving in a horizontal direction at a maximum speed and in a vertical direction at a minimum speed. This period is when the primary and secondary cranks 112 and 113 are in their uppermost position. It is very important that the fingers 119 enter the perforations 123 at this time, since if there were an appreciable down-movement of the fingers the portions of the film immediately surrounding the perforations 123 would be torn.

The outer ends of each of the primary and secondary shafts 104 and 105 are provided with outer heads 125 and 130 from which eccentric pins 131 and 132 respectively, extend. Each pair of pins 131 and 132 carries links 133. This arrangement, just described, is provided for counterbalancing the weight of the cranks of the primary and secondary shafts and the film advancing members. This counterbalancing makes the movement of the advancing mechanism very easy and reduces vibration.

Figure 8:
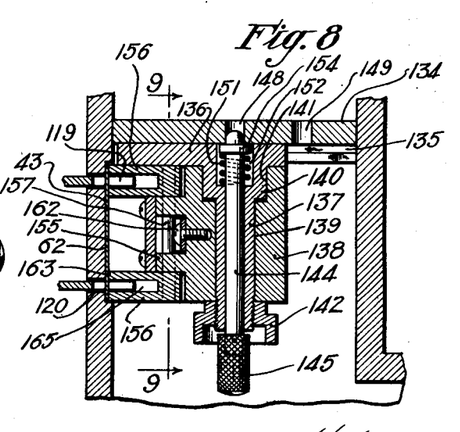
Fig. 8 is a section taken on the line 8—8 of Fig. 7.
Figure 9:
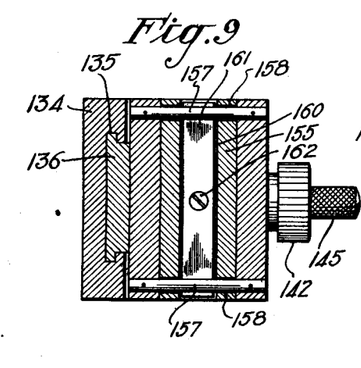
Fig. 9 is a section taken on the lines 9—9 of Figs. 7 and 8.

Near the central and forward part of the mechanism chamber 23 is a pair of partitions 134. In the outer face of each partition 134 there is provided a T groove 135 which extends in a horizontal plane. Carried in each T groove 135 is a T head 136 from which a sleeve 137 extends. Carried on each sleeve 137 is a block 138 having an opening 139 through which each sleeve 137 extends. The block is held from rotation by polygonal portions 140 formed on each of the T heads 136 and which extend into recesses 141 formed in each of the blocks 138. The outer end of each of the sleeves 137 is threaded and a clamp nut 142 is advanced thereonto to lock each of the blocks 138 in place. Extending centrally through each sleeve 137 is a plunger 144, each having a knurled head 145 secured at the outer end thereof. The inner end of each of the plungers 144 is adapted to rest in an opening 148 or an opening 149 of each of the walls 134. Each plunger 144 is resiliently retained in position to extend in either of the openings 148 or 149 by a spring 151 carried in a cavity 152 of each of the T heads 136. Each spring 151 acts against a flange 154 of each of the plungers 144. The front part of each of the blocks 138 is provided with a central portion 155 to each side of which a resilient holder 156 is positioned. Each block therefore is provided with a pair of resilient holders 156. Each pair of holders 156 is secured together by upper and lower bars 157 which extend through elongated openings 158 provided in the central portion 155 of each of the blocks 138. Each central portion 155 is provided with a central groove 160 in which a spring 161 is secured by a screw 162. The ends of each of the springs 161 engage the bars 157 of the pairs of resilient holders 156, and thus resiliently retain the holders in forward position. Front faces 163 of each of the holders 156 are adapted to engage the edge portions 121 and 122 of each of the films 43 directly in back of the slots 120 through which the fingers 119 of the advancing members 118 extend to advance each film during their operation. The resilient holders 156 are provided for the purpose of holding the film in proper position so that it may be properly engaged and properly advanced by the film advancing mechanism. It is necessary to provide each of the resilient holders with a vertically extending slot 165 for the reception of the ends of the fingers 119. Referring to Fig. 8 the fingers 119 when extended through the perforations 123 of each film extend into the vertical openings 165 of each of the resilient holders 156. In Fig. 8 the blocks are shown in forward position so that the resilient holders 156 engage the film. When the film is being threaded or the mechanism is being inspected the plungers 144 are retracted so that the inner ends thereof are disengaged from the openings 148. This allows the assembly to be slid rearwardly in the T slots 135. The assemblies may be retained in rearward position by engagement of the inner ends of the plungers 144 in the openings 149 of the partitions 134.

A shutter shaft 30 extends forwardly through the vertical wall 24 and the forward end thereof is provided with a shutter 170. The shutter 170 is adapted to control the emission of light to each of the films 43. Directly in back of the shutter 170 adjacent to each of the channels 62 is an opening 172 through which light may pass to expose the frames of the film. These openings 172 as shown in Fig. 2 are formed adjacent to the clamp plates 63. In front of the shutter 170 is a lens box 173 which rests in a space 174 above the advancing mechanism compartment 88 and in front of the mechanism chamber 23. A rear wall 176 of the box 173 carries a pair of lenses 177, there being one lens directly in front of each of the light openings 172. The forward part of the lens box 173 may be closed by a cover 178 having openings 179 situated therein directly in front of each of the lenses 177. A lower wall 181 of the lens box 173 is provided with a rack 182 near its central part. The rack 182 (Fig. 3) is engaged by a gear 184 which is secured to a cross shaft 185. The cross shaft 185 extends through side walls of the shell 22 and the outer ends thereof are provided with operating arms 186. The outer ends of the arms 186 are provided in the form of pointers 187 which pass along graduations 188. By swinging either of the operating arms 186 the cross shaft 185 and the gear 184 are rotated in a manner to move the lens box 173. In this manner a proper focusing of both lenses may be accomplished.

When a camera is operated, the shutter 170 is revolved and the frames of the two films 43 are simultaneously exposed through openings 189 of the shutter 170. During the time that the films are being advanced, the shutter 170 is in front of the openings 172 and no light can reach them.

Figure 4:
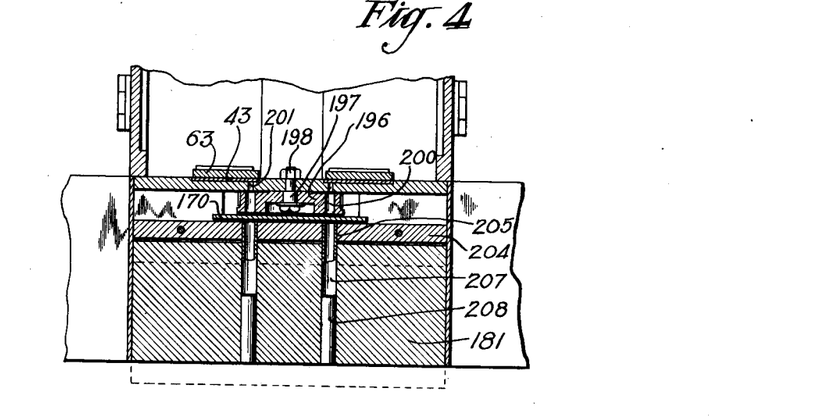
Fig. 4 is a section taken on the line 4—4 of Fig. 3.

The main shaft 26 extends forwardly through the vertical wall 24 and has a small gear 195 secured thereto. This small gear 195 meshes with a circular toothed plate 196 (Fig. 4) which is rotatably supported on a pin 197 which is secured by a nut 198 to the vertical wall 24. This plate 196 is provided with a pair of diametrically opposed apertures 200. These apertures 200 are adapted to align with apertures 201 formed in the wall 24. Each aperture 201 provides access to one edge portion of each of the films 43. Extending across the shell 22 above the wall 89 and in back of the lens box 173 is a bar 204. The bar 204 is provided with a pair of openings 205 which coincide with the apertures 200 when they are in horizontal position, and extending from the openings 205 are tubes 207. Each tube 207 telescopes inside an opening 208 formed in the lower wall 181 of the lens box 173. A light passes through the openings 208 through the tubes 207 through the apertures 200 and 201 and thus strikes the edge portions of the film. The block 204 and the tubes 207 are provided so as to prevent light from passing into the space behind the lens box 173. This construction is necessary since the lens box 173 is adjustable in position. It should be understood, however, that light passes to the edge portions of the two strips of film and exposes them only when the plate 196 is in position so that the apertures 200 thereof are in registry with the apertures 201. This is arranged to occur about every foot of the film. Referring to Fig. 11 each film 43 is provided with an exposed circle 207 in one of its edge portions at every foot. Each of the films thereof has a mark which indicates a frame which has been exposed at a certain time. Therefore, the frames of the film may be accurately paired. The action between adjacent frames is not enough to distinguish them, but the action between the frames a foot apart is enough to distinguish them so that it would be impossible to accidentally align the wrong spots 207 together.

My invention, in the first place, provides a novel form of advancing mechanism which is continuous in operation. There are no parts in my camera which have an intermittent motion. The advancing mechanism, although not intermittent in itself, is designed so that it will intermittently advance, engage and disengage the pair of films 43. This is extremely important since such mechanism is easy to operate and does not have any material vibration. The advancing mechanism of my invention is particularly adapted for high speed operation. In experimenting I have successfully operated my camera at ten times the normal speed without any detrimental effect. The counterbalancing arrangement is important, since it conduces to a smooth running of the invention. It should be understood that although I have shown an advancing mechanism for two films, it could be very easily changed for an advancing mechanism for one film. The feature of exposing edge portions of the two films adjacent to certain frames is also important, since it makes it possible to readily match up frames which have been simultaneously exposed. The feature of the axially movable drive pulley shaft is also of value, since it saves considerable time by eliminating the necessity of properly aligning the shafts when closing the doors of the camera.

I claim as my invention:

1. In a camera the combination of: film advancing means adapted to engage a film for intermittently advancing same; a pair of cranks each directly supporting and operating said film advancing means; and means for operating said cranks in order to operate said film advancing means so that each point in said film advancing means moves in a circular path and in a manner to intermittently advance said film.

2. In a camera the combination of: film advancing means adapted to engage a film for intermittently advancing same; a pair of cranks for supporting and operating said film advancing means; and means for operating said cranks in order to continuously move said film advancing means so that each point in said film advancing means moves in a circular path and in a manner to intermittently advance said film.

3. In a camera the combination of: film advancing means adapted to engage a film for intermittently advancing same; a primary crank; a secondary crank; said film advancing mechanism being directly supported and continuously moved by said primary and secondary cranks when they are in operation; a primary shaft for operating said primary crank; a secondary shaft for operating said secondary crank; means for operating said primary and secondary shafts; and counterbalancing means connecting said primary and secondary shafts for counter-balancing the weight of said cranks and said film advancing mechanism.

4. In a camera the combination of: film advancing means having a finger adapted to extend through a slot in a film; and mechanism for moving said film advancing means through a circular path in order to intermittently advance said film, said finger being arranged to enter a slot of said film when said finger is traveling at right angles to said film at a maximum speed and parallel to said film at a minimum speed.

5. In a camera the combination of: film advancing means adapted to engage a film for intermittently advancing same; a pair of cranks for supporting and operating said film advancing means; and means for operating said cranks in order to continuously move said film advancing means so that each point in said film advancing means moves in a circular path and in a manner to intermittently advance said film, said film advancing means being adapted to engage said film when said cranks are in their uppermost position.

6. In a camera the combination of: film advancing means adapted to engage a film for intermittently advancing same; a primary crank; a secondary crank, each of said cranks directly supporting and operating said film advancing means; and means for operating said cranks to continuously move said film advancing means through a circular path to intermittently advance said film.

7. In a camera the combination of: film advancing means adapted to engage a film for intermittently advancing same; cranks directly supporting and operating said film advancing means; and means for simultaneously operating said cranks to continuously move said film advancing means in a circular path and in a manner to intermittently advance said film, said film advancing means being adapted to engage said film when said cranks are in their uppermost position.

8. In a camera the combination of: film advancing means adapted to engage a film for intermittently advancing same; a primary crank; a secondary crank, said film advancing mechanism being directly supported and continuously moved by said primary and secondary cranks when they are in operation; a primary shaft for operating said primary crank; a secondary shaft for operating said secondary crank; means for operating said primary and secondary shafts; and means connecting said primary and secondary shafts for counter-balancing the weight of said cranks.

9. In a camera the combination of: film advancing means adapted to engage a film for intermittently advancing same; a primary crank; a secondary crank, said film advancing mechanism being directly supported and continuously moved by said primary and secondary cranks when they are in operation; a primary shaft for operating said primary crank; a secondary shaft for operating said secondary crank; means for operating said primary and secondary shafts; and means connecting said primary and secondary shafts for counter-balancing the weight of said cranks and said film advancing mechanism.

10. In a camera the combination of: film advancing means adapted to engage a film for intermittently advancing same; a primary crank; a secondary crank, said film advancing mechanism being directly supported and continuously moved by said primary and secondary cranks when they are in operation; a primary shaft for operating said primary crank; a secondary shaft for operating said secondary crank; means for operating said primary and secondary shafts; and means connecting said primary and secondary shafts for simultaneously counter-balancing the weight of said cranks and said film advancing mechanism.

In testimony whereof, I have hereunto set my hand at Los Angeles, California, this 16th day of November, 1925.

HARRY K. FAIRALL.